June 23, 1936. E. STOCQ 2,045,208
SHOCK ABSORBER FOR VEHICLES AND OTHER LOADS
Filed March 12, 1931
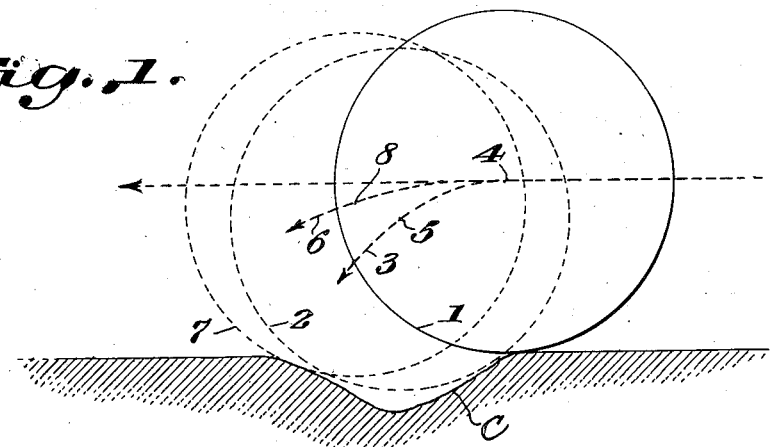
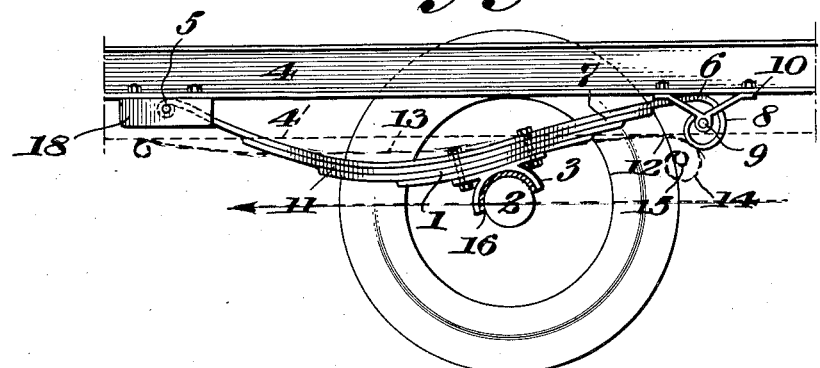
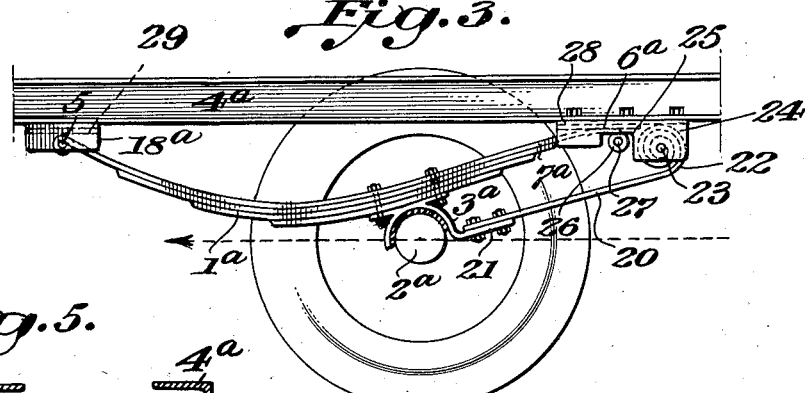
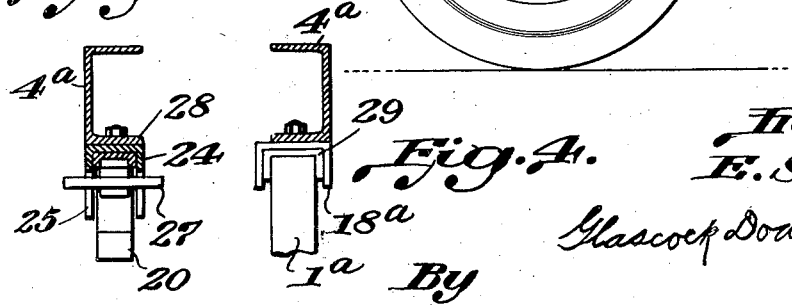
Inventor,
E. Stocq;
Glascock Downing & Seabold
By Attys.

Patented June 23, 1936

2,045,208

UNITED STATES PATENT OFFICE 2,045,208

SHOCK ABSORBER FOR VEHICLES AND OTHER LOADS

Edmond Stocq, Nice, France

Application March 12, 1931, Serial No. 522,130
In Belgium November 28, 1930

2 Claims. (Cl. 267—44)

The present invention has for its object a device for damping the strains any part of a machine (or vehicles etc., for example in its chassis, or seats etc.), is subject to, as a result of the jolts sustained whenever a wheel of the car falls into a hole in the roadway, and for restoring the force thus developed.

Owing to the momentum (vis viva) acquired by a wheel dropped into a cavity of the road, instead of a vertical line the wheel rather follows a parabolic arc. Now, the present device causes the wheel to follow a natural curve when falling into a cavity, and provides at the same time for damping the strains exerted in the various directions.

The accompanying drawing shows, by way of an example, an embodiment of the present invention, viz:

Fig. 1 is a diagram of the positions taken in succession by the wheel of a vehicle running in the direction of the arrow, when about to drop into a cavity, when dropped into same and when getting out of it;

Fig. 2 is a front view of a springing device mounted upon the rear axle of a car through interposition of a support the construction and function of which are to be explained hereinafter;

Fig. 3 is a front view of a springing device after the same principle, but free from any strains due to the momentum (vis viva) acquired by the chassis;

Fig. 4 is a sectional view of the attachment secured underneath the chassis, and of the connection rod provided between the chassis and the wheel axle;

Fig. 5 is a similar transverse section, showing the attachment member the other end of the spring can glide in.

Referring now to the diagram of Fig. 1 in its position 1 the wheel has reached the edge of the cavity c; assuming the car to run at a fair speed, the wheel then takes a position like the one shown by a circle in dotted lines 2 after having followed a parabolic arc 3 which contains the two centres 4 and 5, to finally reach a position like the one shown by dotted circle 7. The faster the car will run, the more will that fall of the wheel approach a horizontal line, by reason of the momentum acquired by the car.

As to the influence of that fall upon the chassis, the wheel undergoes a shock at the end of its descent into the hole, the chassis having a tendency to move farther on, as a result of its momentum. Should the spring not be securely fastened to the axle, it would glide upon the latter, for it would be driven along, by the mass of the chassis, in the direction of running; on the car undergoing jolts due to the holes in the road, heavy stresses are sustained in the direction of running, and this has not been taken into account in the construction of ordinary springs.

A construction designed to avoid this disadvantage is shown in Fig. 2, which refers to a set of springs mounted upon the rear axle of a car; here, the spring *f* rests upon axle 2 through the intermediary of a support 3 in the form of a half sleeve capable of turning about said axle (the construction and function of that support to be described hereinafter). The chassis 4 rests upon the spring 1 at 5 and 6 and the two arms of the spring are of unequal length, the shorter arm 7 ending in a loop 8 attached to the chassis by a pivot member 9 secured to an attachment member 10, these members 9 and 10 being used in lieu of the double shackle ordinarily employed; the larger arm 11 of the spring supports the chassis 4 at its end 5. At the point 5, the chassis 4 is provided with a channel guide member 18 in which the end of the spring is engaged. (Though the chassis be shown here as simply resting at point 5 upon the spring, one might obviously provide for insertion of a roller or of a shackle.) Since these two spring arms 7 and 11 are of unequal length, they share unequal portions of the load; assuming the lever arms to be, for example, in the ration 1:2 the arm 7 will sustain two thirds of the load, the arm 11 sustaining the remaining third. On the chassis descending into the hole, together with the wheel, down to a position as shown by the dotted lines 4' the shorter arm 7 is acted upon more heavily than the long arm 11 and this will cause the whole spring to rock about axle 2 while causing a flexion and upward motion of the long arm 11. When the flexion will have taken up the strain from the chassis the spring 1 will have the position shown by dotted lines 13 (the main plate of the spring being the only one shown here). Now, the flexion undergone by the short arm 7 further brings about a gradual shift of point 6 towards axle 2; as a result that point 6 where the chassis has its bearing moves to 12 on the chassis reaching its lowest position; if the arms 7 and 11 were in the ratio 1:2 prior to the descent of the chassis, the ratio will be, for instance, 1:3 on the spring 1 reaching the position shown in dotted lines. The descent of the chassis thus is more gradually curved than is the case when using an ordinary system, the springs of which always undergo the same amount of flexion, irrespective of their position.

As the arm 11 has but a little load to sustain (only one third in this example) it will be of light construction and will accordingly be very flexible; besides, as its flexion always exceeds the amount of descent of the chassis (about treble in this example) the angular amount of descent will render it the more flexible.

As a result of so gradual an action and of such a flexibility in curbing action against the vertical strains due to the descent of the chassis the curbing will take place far more gently than is the case with the usual types of springs.

Besides, the same flexibility and softness will be observed in the return of the chassis up to its initial position; for the long arm 11 will, when giving back the force it had taken up, cause support 3 to turn about the axle and raise the short arm 7, whereby the chassis will be restored to its initial position. Now, while raising the chassis up again, the short arm gradually resumes its initial form, and this results in gradually shifting the point 12 away from axle 2; that point 12 where the chassis has its bearing will thus gradually revert to position 6 it had started from. Therefore, conversely to what had happened during the descent of the chassis the ratio of these two arms 7 and 11 will more and more decrease down to the value it had prior to the descent of the chassis.

The support 3 has its lower portion (the one portion resting upon axle 2) lined either with ferodo, or leather, or any other material 16 suitable for producing a braking action. When that support 3 is (owing to the vibrations of spring 1) turned about axle 2 it exerts a curbing effect resulting in absorption of a portion of the strain brought about by the descent of the chassis; that support 3 therefore acts as a shock damper the effect of which takes place gradually, since its curbing action gets more and more powerful as the load transmitted to axle 2 by spring 1 increases. Moreover another advantage of that shock damper, lies in that it cannot get out of adjustment, because its action is not altered through wear of the ferodo (or other) lining.

The function of spring 1 as above described only refers to strains exerted in a vertical direction as a result of the descent of the chassis; now, as has been stated, such descent would (on account of the momentum acquired by the mass, if the vehicle be running at a fair speed, create, in the direction of running, a strain checked by the resilient loop 8 which is actually a spring, caused to get out of shape owing to the force so developed, and to take up a position like the one shown in dotted lines 14: thanks to that deformation of the loop the chassis can shift, with respect to the axle, and this horizontal shift of the chassis corresponds to the horizontal displacement of pivot 9 to position 15. As soon as the strain derived from the momentum has been absorbed by the deformation of the loop 8 this latter restores that force back to the axle 2 which accordingly reverts to the position it had initially with respect to the chassis.

The combined effects of these two spring-acting members, say, one reacting against vertical shocks and the other one (loop 8) reacting against any strains derived from the momentum acquired by the chassis, results in absorption of the strains originated by the descent of the chassis and now transmitted in a natural direction again.

In addition to its function as a spring, loop 8 advantageously replaces the double shackle which is usually inserted between the springs of the chassis.

Should it be desirable to free spring 1 from any strains derived from the momentum acquired by the chassis (as will be preferred in the case of heavy cars) one can adopt the construction shown in Fig. 3 wherein those strains are absorbed and restituted by an independent spring-acting member, having, in this example, the shape of a resilient link-bar 20 for connection of chassis 4a with axle 2a. That resilient link 20 has the effect of transmitting to chassis 4 the propulsive strain from axle 2a and of keeping back the chassis whenever braking is applied on the car wheels; it further acts to absorb and restore again the strain from the chassis whenever the wheel drops into a hole of the road.

It need not be added that this resilient link bar could be replaced by any other member of equivalent action, and could be of variable description, it being simply shown here in the shape of a strong steel plate of a construction to be explained further on.

This Fig. 3 shows a system of rocking spring similar to that of Fig. 2, the difference lying in that the short arm 7a, instead of being secured to chassis 4a, simply supports said chassis at point 6a, the connection between chassis and axle being embodied in the resilient rod 20. The support 3a has been, for the purpose, provided with an extension 21 so devised that any reactions derived from it will run through the axis of axle 2a. The other end of that link rod is shaped as a spring acting loop 22 fastened by pivot member 23 to the attachment member 24 secured to the chassis.

As can be seen in Fig. 5 (sectional view) the attachment member 24 has somewhat the shape of a U-section iron (with shortened side wings) secured underneath the chassis 4a and provided inside with a ferodo lining 28 where the chassis rests upon arm 7a of the spring; that ferodo lining being intended to avoid any friction which would be exerted direct by the chassis upon the spring, and to curb, to a little extent, the action of said spring. The side wings of attachment member 24 are so cut as to leave a notch 25 exposing the small loop 26 the arm 7a ends in, a pin 27 being securely held in that loop 26. This pin 27 as shown in Fig. 5 projects beyond both sides of the attachment member 24 and is a safety contrivance, for, in case the resilient rod 20 happens to break, any horizontal displacement of the chassis 4a with respect to axle 2a will be impossible beyond the limits confined to the sides of notch 25.

Fig. 4 is a sectional view of the member 18a inside which the end of the large arm of spring 1a can glide; that member 18a likewise has the shape of a U-section iron secured underneath the chassis, and is likewise provided with a ferodo (or other) lining 19 to avoid any direct friction of the chassis against the spring and to obtain a certain amount of curbing action.

It need not be added that, to allow the chassis some amount of horizontal displacement with respect to the axle certain mechanical members of the chassis should be constructed in view of that purpose (this referring namely to the coupling of the Olham shaft).

It goes without saying that all these devices have only been described and illustrated by way of example and not by way of limitation, in the sense that the invention extends to any system in which one or more of the above mentioned principles are applied.

Having thus particularly described and ascertained the subject-matter of my said invention and in what manner the same is to be performed, I declare that what I claim is:—

1. In a vehicle, an axle, a leaf spring, a chassis resting on said spring adjacent the ends thereof, a half sleeve on the axle interposed between said leaf spring and said axle, said spring being disposed with relation to the axle to provide an arm at one side of the latter of greater length than the arm at the other side thereof, the relatively short arm having a relatively low degree of resiliency and terminating in a loop, means connecting said loop with said chassis, the long arm having a high degree of flexibility and said sleeve permitting rocking movement of the spring about the axle.

2. A vehicle as claimed in claim 1, characterized by the provision of a lining of friction material in said sleeve adapted to produce a braking effect.

EDMOND STOCQ.